Oct. 27, 1964 G. S. KATTER 3,154,126
WIDE BASE WHEEL TIRE ASSEMBLY
Filed June 10, 1963 2 Sheets-Sheet 1
FIG. 1
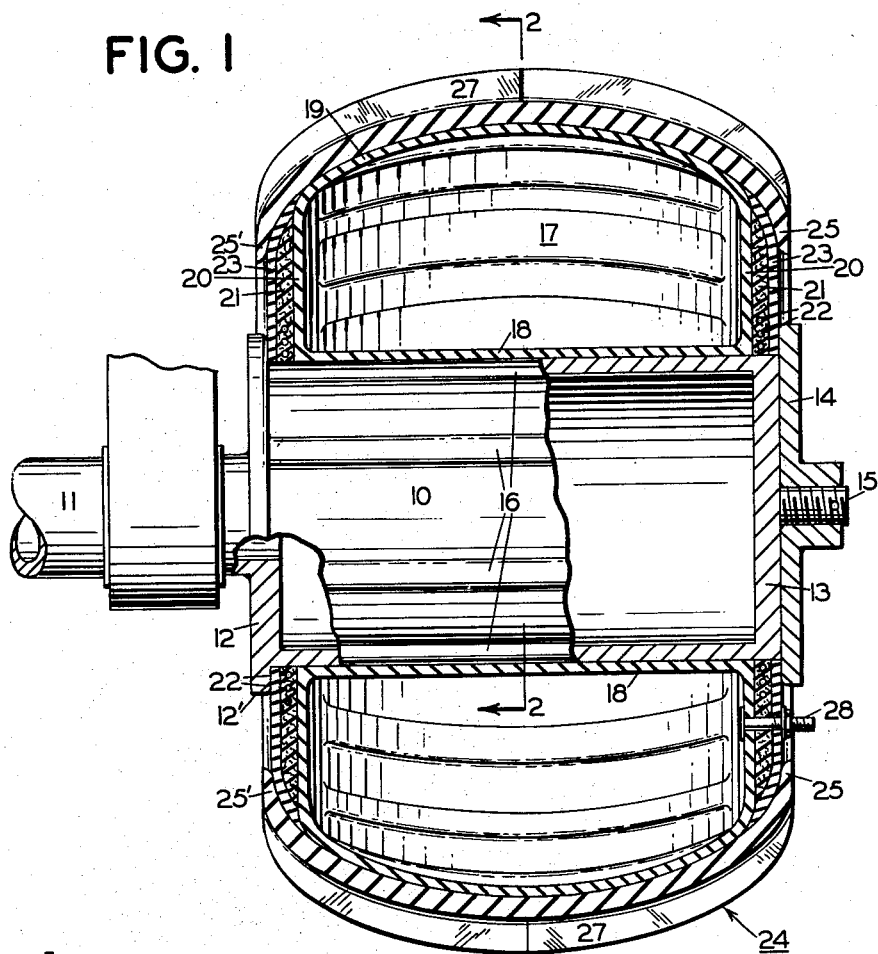
FIG. 3
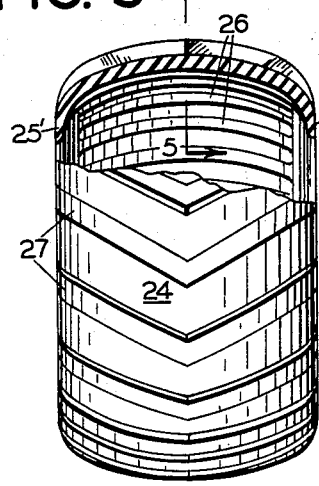
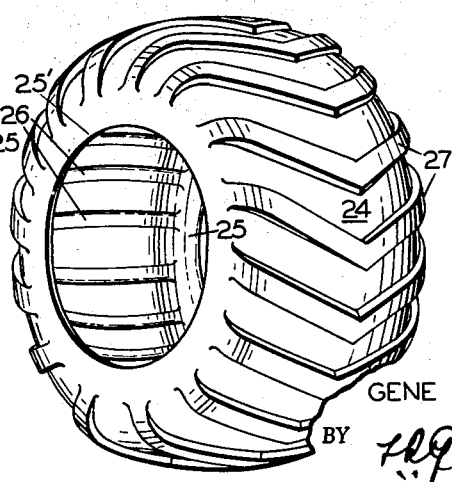
FIG. 4
INVENTOR.
GENE S. KATTER
BY
ATTORNEY Oct. 27, 1964　　　G. S. KATTER　　　3,154,126
WIDE BASE WHEEL TIRE ASSEMBLY
Filed June 10, 1963　　　　　　　　　　2 Sheets-Sheet 2

INVENTOR.
GENE S. KATTER
BY
ATTORNEY

United States Patent Office 3,154,126
Patented Oct. 27, 1964

3,154,126
WIDE BASE WHEEL TIRE ASSEMBLY
Gene S. Katter, Eugene, Oreg.
(Box 204, Brownsville, Oreg.)
Filed June 10, 1963, Ser. No. 286,564
6 Claims. (Cl. 152—9)

This invention relates in general to inflatable tires for vehicle wheels, and, more specifically, to so-called wide base tires which have a large cross sectional area in comparison with the maximum tire diameter so as to provide a much larger area of running surface.

Such wide base tires and wheel assemblies have been used on vehicles operating on soft or marshy ground, such as "swamp buggies," have also been used on amphibious craft, such as "car-boats" where the wide base tires serve a double purpose, and have been used to some extent on other types of vehicles and for other purposes. However, heretofore such wide base tires and wheel assemblies have generally presented such objectionable features as complicated and expensive construction, difficulties in providing suitable wheels and hubs for the wide base tires and for securing proper mounting of the wide base tires on the same, difficulties in having the wide base tires easily removable from their wheels or hubs, and exceptional maintenance problems.

An object of the present invention is to provide an improved wide base wheel tire assembly of simple, practical construction with the tire arranged for easy and satisfactory mounting on a hub or suitable driving member.

A related object is to provide a novel wide base wheel tire assembly including a driving member or hub of simple design and construction specifically adapted to have an improved wide base inflatable tire easily mounted thereon and from which the tire may be easily removed when deflated.

Another and important object of this invention is to provide an improved wide base inflatable tire body especially designed for use with a separate and removable outer tread member.

A further related object is to provide a companion novel outer tread member for an inflatable tire body which will be specifically constructed for removable mounting on the tire body and which will, when mounted thereon, cause the perimeter of the tire body, when the tire body is inflated, to be firmly confined within the tread member.

The manner in which and the means by which these objects and other advantages are attained with the present invention, and the construction and formation of the individual members of the assembly, will be briefly explained and described with reference to the accompanying drawings.

In the drawings:

FIG. 1 is a sectional elevation of the entire assembly taken approximately along the axial line of the same and showing one type of tread member on the inflated body portion of the tire;

FIG. 3 is an elevation, drawn to a smaller scale, of the tread member of the assembly by itself;

FIG. 4 is a perspective view of the tread member by itself drawn to the same scale as FIG. 3;

Figure 2:
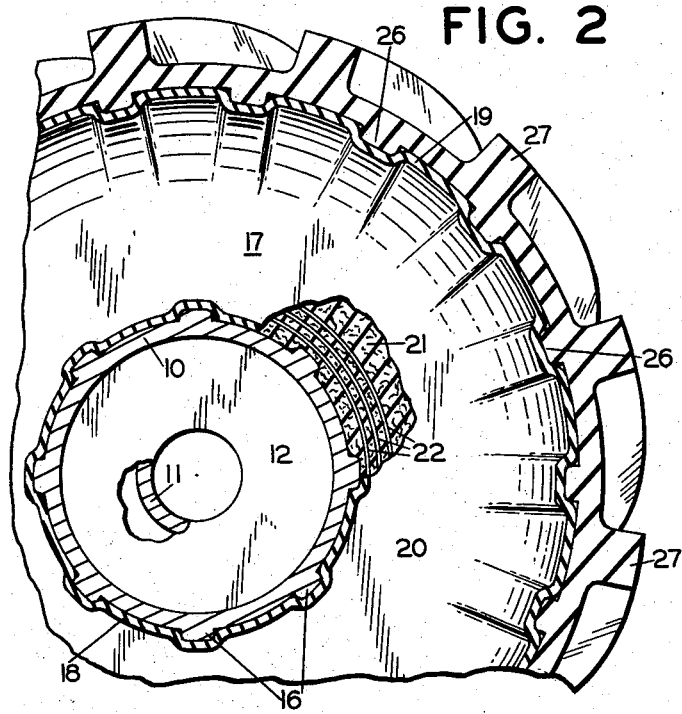
FIG. 2 is a fragmentary transverse section taken on line 2—2 of FIG. 1 with a portion of the inflatable tire body shown broken away for clarity.

Referring first to FIG. 1, the assembly as illustrated includes an enlarged hub member 10, which is shown in this figure and also in FIG. 2 as formed integrally on the end of a vehicle drive axle 11, although it is to be understood that this enlarged hub member 10 may also be removably mounted on the axle by providing an annular flange on the end of the axle and providing registering bolt holes in such flange and in the inside end wall of the hub member, whereby the hub member may be bolted to the axle flange in axial alignment with the vehicle drive axle. In any event this inside wall 12 of the hub member is extended beyond the cylindrical wall of the hub to provide an annular tire-retaining flange 12' at the inside end of the hub on the vehicle axle. This flange is omitted on the other or outer end 13 of the hub member in order to enable the tire body to be easily mounted on or removed from the hub member, and an outer tire-retaining disc 14 is removably secured on the hub member in any suitable manner, for example, by means of an integral lug 15, extending outwardly axially from the end wall 13 of the hub member.

The cylindrical wall of the hub member 10 is either fluted longitudinally, that is to say, formed with parallel longitudinally extending ridges and valleys, or the outer surface of this cylindrical wall is formed with parallel longitudinally extending, equally spaced, ribs 16, as shown in FIG. 2. The reason for this will be presently apparent.

The body portion of the inflatable tire, designated as a whole in FIGS. 1 and 2 by the reference character 17, is composed of a sealed tube of soft rubber, similar to the material heretofore commonly used for inner tubes in vehicle tires. This tube is so formed as to have an inner peripheral portion 18 (FIGS. 1 and 2) and an outer peripheral portion 19 comprising a single thickness of the soft pliable rubber, but with side walls 20 which are provided with composite semi-rigid reinforcing layers and elements.

Each side wall 20 of the inflatable tire body portion 17 has a reinforcing annular disc-like portion 21 (FIG. 1) which portion is formed of a plurality of layers of cord fabric impregnated with a suitable rubber component. The inner periphery of each of these reinforcing portions 21 is made of the proper size and configuration to fit over the hub member 10. The diameter of the other periphery of each of these reinforcing wall portions 21 is somewhat less than the maximum diameter to which the outer peripheral portion 19 of the soft rubber of the main tire body 17 would be expected to be reduced by contact of the entire assembly with the ground under normal operating conditions with maximum vehicle load.

A plurality of rings 22 of spring steel wire of slightly different diameters are embedded in each of the reinforcing wall portions 21 in the area around the inner periphery. The purpose of these rings is to prevent any possible stretching of the reinforced side walls in an outward radial direction when the tire is mounted on the hub member.

Each reinforcing wall portion 21 in turn is provided with an outer layer 23 of tread rubber of firm consistency to add to the comparative rigidity of the side walls of the composite tire structure and to provide a suitable outside facing for the sides of the tire body. The thickness of each annular reinforcing wall portion 21 decreases near its outer periphery so as to form a tapered peripheral edge enabling the outer layer 23 of the heavy tread rubber to unite with the peripheral portion 19 of soft rubber of the inflatable main body of the tire in a smooth juncture.

A suitable air valve 28 (FIG. 1), of standard construction, is provided in the reinforced composite side wall of the tire body so as to enable the main tire body 17 to be inflated or deflated as required.

The tire assembly is completed by the addition of a removable tread member 24 (FIGS. 1 to 5 inclusive). The tread member in brief is a molded ring, outwardly convex in cross section, and of proper width and diametrical size to provide the entire ground-engaging surface area of the tire assembly and to cover entirely the soft rubber outer periphery 19 of the inflatable body portion 17 of the tire.

Preferably the tread member 24 is made of tough corrosion-resistant, abrasion-resistant, pliable and non-stretch material, which may be molded instead of being laminated. For this purpose it has been found that a special nylon material, known on the market is "Dupont FM–10,001 Nylon," is very satisfactory. However, other materials suitable for the heavy duty tread portion of automobile tires may also be satisfactorily used.

The two outside peripheral edge portions 25 and 25' (FIGS. 1 and 3) of the tread member 24 are so molded and sized as to fit down over the perimeters of the composite reinforced side wall portions of the main tire body when the tread member 24 is set in place on the tire body 17, as shown in FIG. 1, and the edge portions of the tread member 24 are made of reduced thickness in addition to having the final diameter of these edge portions made less than the diameter of the periphery of the reinforced side wall portions of the main body 17 of the tire so that the peripheral edge portions 25 and 25' of the tread member 24 will fit snugly over the outer peripheries of the composite reinforced side wall portions of the tire body upon inflation of the tire body.

The inside face of the tread member 24 is formed with transversely, inwardly extending, raised portions or ribs 26. The outside face of the tread member is provided with a suitable surfacing and with suitable treads 27, depending upon the nature of the ground on which the tread member is to be used or other conditions under which the tire assembly will be operated. Obviously the outside face of the tread member 24 may be provided with various surfacings, such as lug treads, etc., and may be impregnated with abrasive material desired for insuring good traction under specific conditions of use.

The manner in which the tire assembly is set up for use on the hub member 10 will be apparent from FIG. 1. With the outer retaining disc 14 removed from the hub member 10, the main body portion 17 of the tire, in deflated or partially deflated condition, is slid entirely onto the hub member 10 and the retaining disc 14 is then secured to the hub. The tread member 24 is then set in place over the deflated body portion 17, the composite side walls of the body portion being capable of being bent inwardly sufficiently to enable one of the edge peripheral portions of the tread member to pass over such composite side walls. With the main body member and the tread member then in place, the inflation of the main body member to the proper desired pressure will cause the assembly to assume the operating position of FIG. 1. The soft rubber of the inner periphery 18 of the main body portion 17, under the air pressure within the tire, will not only be expanded sufficiently to cause the side wall portions of the tire to bear against the flange 12' and the retaining disc 14 respectively, but this pressure will cause the inner periphery 18 of the soft rubber to have a gripping hold on the fluted or ribbed cylindrical wall of the hub 10. Similarly the air pressure within the tube will cause the outer periphery 19 of soft rubber of the main body portion to bear against the ribbed inside face of the tread member 24 so as to cause a firm hold between the main body portion and the tread member of the tire assembly. Furthermore the air pressure within the main body portion of the tire will hold the composite reinforced side walls firmly out against the side peripheral portions of the tread member. Thus the tread member 24 will be firmly secured on the main body portion 17 as long as the main body portion remains sufficiently inflated. Any stretching of the composite reinforced side walls radially outwardly from the hub 10 is prevented by the construction of the reinforcement layer in the side walls including the steel wire rings. Since the tread member 24, due to its composition, cannot stretch or expand, in spite of its flexibility, it cannot slip off from, or work loose on the main body portion of the tire as long as the latter remains properly inflated.

As previously mentioned the outside face of the tread member 24 may be surfaced in various ways, and, since the tread member may easily be removed from the main body portion 17 and replaced, it is possible to have different sets of tread members so as to enable the wheel assembly to be changed to suit different uses for the same vehicle.

Figure 6:
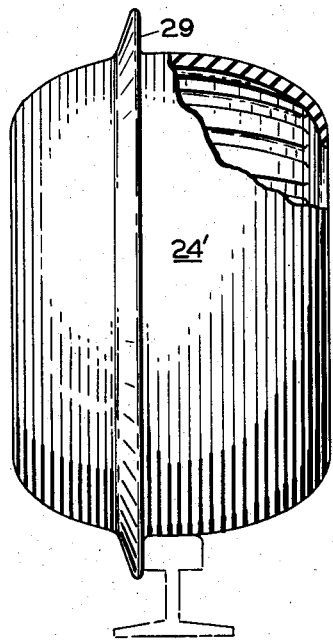
FIG. 6 is an elevation, with portions broken away for clarity, of another tread member by itself, illustrating the way in which the outer surface of the tread member may be formed when the wheel of the assembly is desired for use on a vehicle operated on a railroad track.
Figure 5:
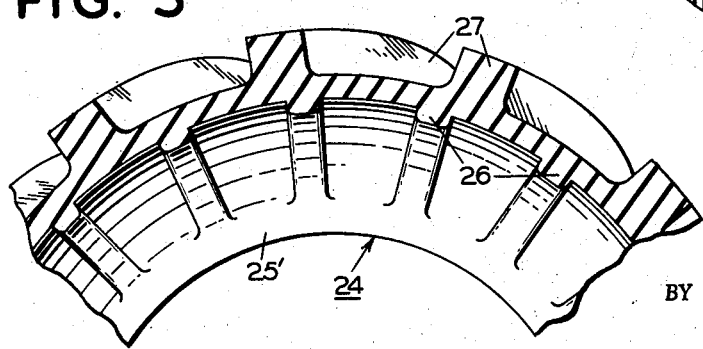
FIG. 5 is a fragmentary section on line 5—5 of FIG. 3, drawn to a larger scale.

For illustration FIG. 6 shows another way in which the outer surface of the tread member may be formed. In this case, the tread member 24 is provided with a special annular radial flange 29 serving the same purpose as the flange on an ordinary railroad car wheel. Thus should it be desired to operate the particular vehicle in question along a railroad track, assuming the spacing between the opposite wheels to be satisfactory for this purpose, the changing of the tread member of each wheel assembly to that shown in FIG. 6 will enable such special use of the vehicle to be made.

Obviously other tread members, appropriate for entirely different uses of the vehicle, may be substituted similarly, and various minor modifications could also be made in each of the cooperating members of the assembly, namely the hub member, the main tire body portion, and the tread member, without departing from the principle of the invention.

I claim:

1. In a wide base wheel tire assembly of the character described, a substantially cylindrical hub member having an axial length equal approximately to the desired width for the assembly, an inflatable tire body having an inner periphery of flexible soft rubber and reinforced side walls, each of said side walls having an annular non-stretch semi-flexible reinforcement, the inner periphery of said side wall reinforcements conforming substantially to said hub, the outer periphery of each of said reinforcements being less than the desired minimum outside diameter of the tire under normal conditions of use, a metal ring embedded in each of said side reinforcements to prevent radial stretching of the reinforced side walls, a tire valve in said tire body enabling said tire body to be inflated or deflated, said hub having ribs extending longitudinally along said hub to provide a gripping hold on said hub by said inner periphery of said tire body, and a flange at each end of said hub for holding said tire body against lateral displacement on said hub, the flange at one end of said hub being removable.

2. A wide base wheel tire assembly including a substantially cylindrical hub member having an axial length equal to the desired width for the assembly, an inflatable tire body having inner and outer peripheries of flexible soft rubber and reinforced side walls, each of said side walls having an annular non-stretch semi-flexible reinforcement, the outer periphery of each of said reinforcements being less than the desired minimum outside diameter of the tire assembly under normal conditions of use, a tire valve in said tire body enabling said tire body to be inflated or deflated, said hub having means to provide a gripping hold on said hub by said inner periphery of said tire body, a flange at each end of said hub for holding said tire body against lateral displacement on said hub, the flange at one end of said hub being removable, and a removable tread member of flexible non-stretch material for said assembly, said member formed in the shape of a ring outwardly convex in cross section, the width of said tread member being slightly greater than the width of said tire body, the diameter of each side periphery of said tread member being slightly less than the peripheral diameter of said side wall reinforcements of said tire body, the inside surface of said tread member having transversely-extending ridges and valleys for engagement by said outer peripheral wall of said tire body.

3. A wide base wheel tire assembly including a substantially cylindrical hub member having an axial length equal to the desired width for the assembly, an inflatable tire body having inner and outer peripheries of flexible soft rubber and an annular non-stretch semi-flexible reinforcement on each side wall, the inner periphery of each of said side wall reinforcements conforming substantially to said hub, the outer periphery of each of said reinforcements being less than the desired minimum outside diameter of the tire assembly under normal conditions of use, a metal ring embedded in each of said side reinforcements to prevent radial stretching of the reinforced side walls of said tire body, an outer surfacing of tread rubber on each reinforced side wall, a tire valve in said tire body enabling said tire body to be inflated or deflated, said hub having ribs to provide a gripping hold on said hub by said inner periphery of said tire body, a flange at each end of said hub for holding said tire body against lateral displacement on said hub, the flange at one end of said hub being removable, and a removable tread member of flexible non-stretch material on said tire body, said tread member formed in the shape of a ring outwardly convex in cross section, the width of said tread member being slightly greater than the width of said tire body, the diameter of each side periphery of said tread member being slightly less than the peripheral diameter of said side wall reinforcements of said tire body, the inside surface of said tread member having transversely-extending ribs for engagement by said outer peripheral wall of said tire body.

4. The assembly set forth in claim 3 with the addition of an annular railroad wheel type flange on the outer face of said tread member.

5. In a wide base wheel tire assembly of the character described, a hub member having an axial length equal approximately to the width of the assembly, an inflatable tire body having inner and outer peripheries of flexible soft rubber, an annular non-stretch semi-flexible reinforcement on the outside of each side wall of said tire body, the inner periphery of each of said side wall reinforcements conforming substantially to said hub member, the outer periphery of each of said side wall reinforcements being less than the desired minimum outside diameter of the tire assembly under normal conditions of use, and a removable tread member of flexible non-stretch material for said assembly on said tire body, said tread member formed in the shape of a ring outwardly convex in cross section, the diameter of each side periphery of said tread member being less than the outer peripheral diameter of each side wall reinforcement, said tread member overlapping said side wall reinforcements.

6. The assembly set forth in claim 5 with said side wall reinforcements decreasing in thickness at their overlapped outer peripheral portions.

References Cited in the file of this patent
UNITED STATES PATENTS

| | | |
|---|---|---|
| 2,005,627 | Maranville | June 18, 1935 |
| 2,582,715 | Murray | Jan. 15, 1952 |
| 3,034,554 | Noble et al. | May 15, 1962 |